US 6,628,778 B1

United States Patent
Satomi et al.

(10) Patent No.: US 6,628,778 B1
(45) Date of Patent: Sep. 30, 2003

(54) AUTOMATIC RELAY METHOD AND STORAGE MEDIUM CONTAINING AUTOMATIC RELAY PROCESSING PROGRAM

(75) Inventors: Shigeki Satomi, Yokohama (JP); Taku Seki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/370,989

(22) Filed: Aug. 10, 1999

(30) Foreign Application Priority Data

Aug. 11, 1998 (JP) .......................................... 10-226841

(51) Int. Cl.[7] .......................... H04M 3/00; H04M 5/00; G06F 17/60
(52) U.S. Cl. ............................ 379/265.02; 379/265.14; 379/219; 705/8
(58) Field of Search ....................... 379/265.02, 266.01, 379/220.01, 309, 219, 265.11–265.14; 713/168, 182; 705/7–9

(56) References Cited

U.S. PATENT DOCUMENTS 5,452,350 A * 9/1995 Reynolds et al. ...... 379/112.01
6,134,530 A * 10/2000 Bunting et al. ........ 379/220.01

FOREIGN PATENT DOCUMENTS

JP          9-214611        8/1997

* cited by examiner

Primary Examiner—Benny Tieu
(74) Attorney, Agent, or Firm—Mattingly, Stanger & Malur, P.C.

(57) ABSTRACT

A relay method for an automatic relay system to be connected via a public network to a node used by a customer, to relay an incoming call from the node to one of a plurality of telephone answering windows. In the automatic relay system, upon reception of an incoming call from the node, a telephone answering window data base holding business hours and telephone numbers of the respective telephone answering windows is searched for an available telephone answering window at the time of reception of the incoming call. If a telephone answering window available at the time of reception of the incoming call is found, the telephone number of the telephone answering window is read from the telephone answering window data base, and a call is originated to the telephone answering window. After establishment of communication with the telephone answering window as a relay destination, the automatic relay system starts relay of communication between the node and the relay destination telephone answering window, thus providing telephone answering window service to the customer.

15 Claims, 9 Drawing Sheets

| CALL ORIGINATOR NUMBER | PRODUCT IDENTIFIER | REGISTRATION FLAG | INQUIRY CONTENT CODE | REMARKS |
|---|---|---|---|---|
| 044-555-5555 | 10000001 | 1 (REGISTEREL) | 11,12 | |
| 03-1111-1111 | 10000213 | 1 (REGISTEREL) | 11,12 | |
| — | 10000214 | 0 (UN REGISTEREL) | 11,12 | |
| .... | .... | .... | .... | .... |
| — | 20000755 | 0 (UN REGISTEREL) | 21,22,23 | |
| 045-777-7777 | 20000756 | 1 (REGISTEREL) | 21,22,23 | |
| .... | .... | .... | 21,22,23 | .... |

FIG.4

| BUSINESS HOURS | INQUIRY CONTENT CODE | TELEPHONE ANSWERING WINDOW NAME | TELEPHONE ANSWERING WINDOW NUMBER | REMARKS |
|---|---|---|---|---|
| 8:00~16:00 | 11, 12, 22 | A | 0120-111111 | |
| 16:00~24:00 | 21, 22, 23, 12 | B | 0120-222222 | |
| 0:00~8:00 | 11, 12 | C | 0120-333333 | |
| 12:00~20:00 | 11, 21, 22, 23 | D | 0120-444444 | |
| 20:00~4:00 | 12, 21, 22 | E | 0120-555555 | |

FIG.5

| CALL ORIGINATING CUSTOMER NUMBER | RELAY DESTINATION TELEPHONE ANSWERING WINDOW NAMES | CONNETION START TIME | CONNETION END TIME | ACCESS PERIOD |
|---|---|---|---|---|
| 011-123-4567 | B | 17 :24 | 17:55 | 0:31 |
| 0422-11-1111 | B | 18 :00 | 18:05 | 0:05 |
| 0423-22-2222 | D | 19 :40 | 19:55 | 0:15 |
| 06-111-1111 | E | 2 :13 | 3:15 | 1:02 |
| 022-111-1111 | A | 6 :45 | 7:15 | 0:30 |

AUTOMATIC RELAY METHOD AND STORAGE MEDIUM CONTAINING AUTOMATIC RELAY PROCESSING PROGRAM

BACKGROUND OF THE INVENTION

The present invention relates to an automatic relay system for controlling access to a telephone answering window service, and particularly, to a technique effectively applicable to an automatic relay system which enables user's 24-hour access to necessary telephone answering window without taking notice of business hours of the telephone answering window, and enables automatic registration of new user of telephone answering window service, by utilizing notification of call originator number via a communication network and product identification information inputted by the user.

In recent years, call originator number notification service has been started in public networks, following ISDN (Integrated Services Digital Network) systems and cellular phone network systems and the like. Further, in telephone answering window service to respond to inquiries from customers, a so-called CTI (Computer Telephony Integration) system has been adopted. In the CTI system, during business hours, upon reception of an incoming call, pre-stored customer information is referred to based on a call originator number notified from the network in response to the call origination by the customer, and a response can be made to the customer's inquiry. Further, with respect to an incoming call from a customer after the business hours, it can be arranged such that voice message notifying that the call has been made after business hours and advising the customer to call again during the business hours, or informing the customer of the telephone number of another telephone answering window.

By utilizing this CTI system, for example, Japanese Published Unexamined Patent Application No. Hei 09-214611 discloses a method of operating a telephone answering window to ask a user who has made a call after business hours to call again. According to the disclosed technique, the operating method is realized by repeater function and audio answering function of a private branch exchange. Conventionally, the CTI system does not conduct telephone answering window service after business hours, except special cases, and calls back only to an emergency call. Accordingly, when a customer newly makes a registration for use of telephone answering window service, the customer must file an application via mailing or facsimile. On the other hand, the operating side of the telephone answering window must perform computer on-line registration or the like. Further, the user must perform communication in correspondence with the business hours of the telephone answering window if contact with the telephone answering window is required.

As described above, in the telephone answering window service utilizing the conventional CTI system, a customer on the call originating side who needs information from the telephone answering window after business hours must perform communication with respect to another telephone answering window at another place plural times, or wait until the telephone answering window opens in the business hours and the information can be obtained. Generally, in a case where the customer must take notice of business hours of a telephone answering window, after the business hours, the customer often makes a call plural times to the telephone answering window, thus the operation of telephone answering window lacks reliability. Further, upon registration of use of telephone answering window prior to the initial use of the window service, the customer side must file an application by mail or the like and the telephone answering window side must perform registration work, thus these procedures are burdensome to both sides.

SUMMARY OF THE INVENTION

The present invention has its object to solve the above problems and enable a customer to access to a telephone answering window to obtain necessary information without taking notice of business hours.

According to the present invention, the foregoing object is attained by providing an automatic relay method for a telephone answering window to provide telephone answering window service to customers. In the method, upon reception of incoming call from a customer, a search is performed for a telephone answering window available at that time, and the call is relayed to the found telephone answering window. Thus telephone answering window service can be provided to the customer.

According to the present invention, provided is a network system having a plurality of nodes connected to a communication network, an automatic relay system to be connected to these nodes via the communication network, an access authority data base connected to the automatic relay system and a telephone answering window management data base. In the system, business hours, telephone numbers and available services are registered in advance in the telephone answering window data base.

In a preferred aspect of the present invention, when a customer first accesses to telephone answering window service, registration for use is made, and access authority is set in the automatic relay system. The access authority setting is made by registering a call originator identifier notified from the network to the automatic relay system upon call origination from the node on the customer side and a product identifier sent from the node on the customer side, into the access authority data base. The entry of the product identifier into the node on the customer side is made via push buttons of the node in accordance with voice guidance sent from the automatic relay system side to the node. The product identifier may be a serial number of computer software or the like, packaged with the product and notified to the customer at the point of sale.

In the preferred aspect of the present invention, in the second and subsequent connections, the automatic relay system relays a call to a necessary telephone answering window by comparison between the call originator identifier notified from the network and the access authority data base, and comparison between time of incoming call and business hours and service contents of the telephone answering windows. When it is necessary to update the registration due to purchase of a new product or upgrade of the product registered in the automatic relay system, change or addition is made with respect to the registered contents based on information inputted in accordance with voice guidance. The valid access authority at a telephone answering window is judged based on the call originator identifier of the customer node notified from the network and information inputted by the customer in accordance with voice guidance.

In the series of processings, the customer makes a call from the customer node and inputs information, thus, the customer is allowed to use ensured telephone answering window service in correspondence with registration of use, authorization of access authority, and time of reception of incoming call. Further, the conventional burdensome application for use of telephone answering window by filing documents by mail or the like can be replaced with quick registration with reduced steps by inputting highly-reliable call originator identifier notified from the network and a product identifier delivered with the product to the customer in advance.

Thus, according to the present invention, the customer can make a call to the telephone answering window without taking notice of business hours of the window, and on the side of the telephone answering window, an incoming call can be reliably relayed to a labor-saving and desired telephone answering window without an operator.

DESCRIPTION OF THE PREFERRED EMBODIMENTS

Next, an automatic relay system as an embodiment of the present invention will be described in a case where a customer's telephone inquiry about a software product sold to the customer is relayed automatically.

Figure 1:
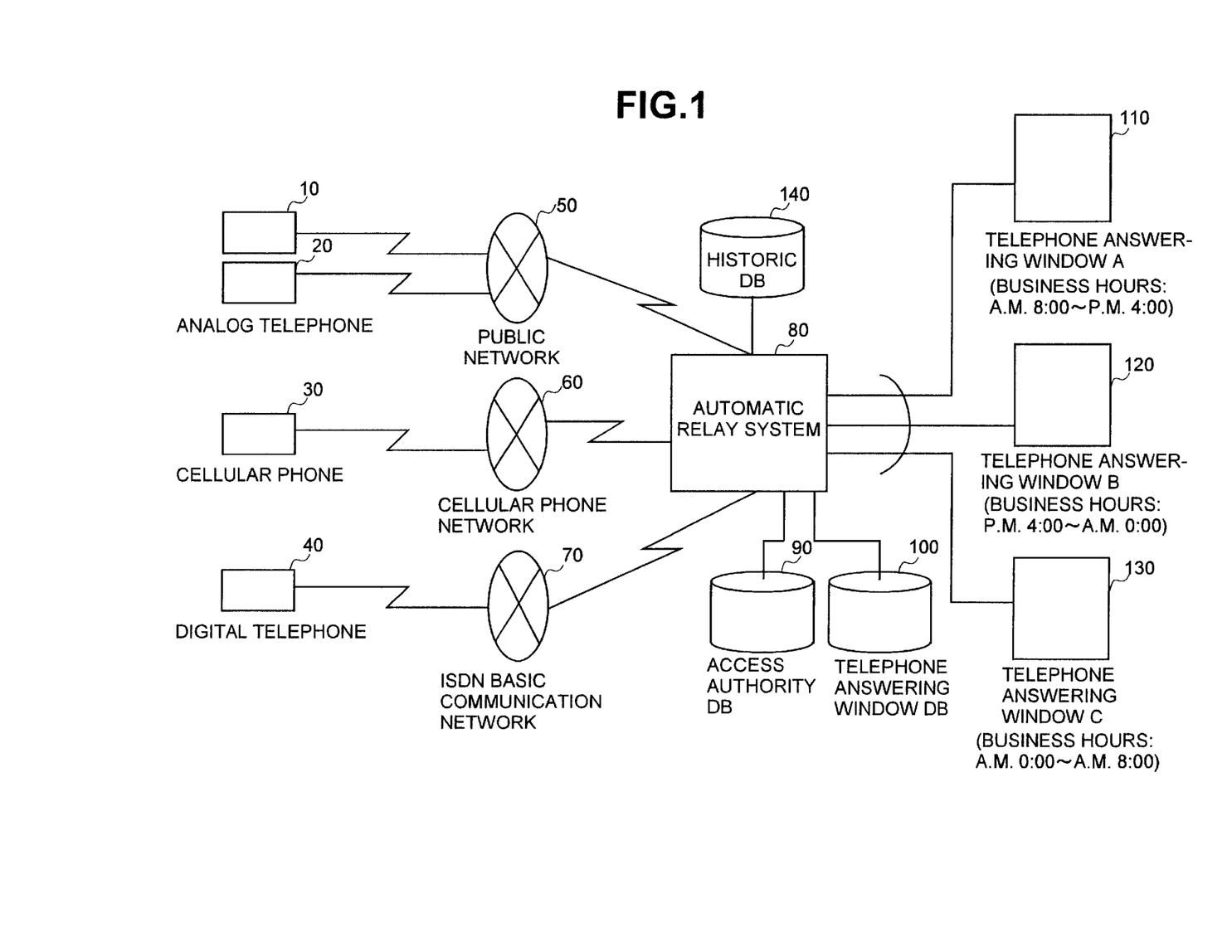
FIG. 1 is a block diagram showing a system configuration of a network system to which the present invention is applied.

FIG. 1 is a block diagram showing a system configuration of a network system according to the present embodiment of the present invention. As shown in FIG. 1, in the network system, a public network 50, a cellular phone network 60 and an ISDN basic communication network 70 are connected to an automatic relay system 80. The public network 50 is connected to a plurality of analog telephones 10 and 20. The analog telephones 10 and 20 use a so-called call originator number notification service to notify the telephone number of a call originator from a public network to a connection destination. The analog telephones 10 and 20 are connected via the public network 50 to the automatic relay system 80. The cellular phone network 60 is used for communication by using a cellular phone 30. In the cellular phone 30, a call originator number notification function to notify its own telephone number via the network to a connection destination is effective. The cellular phone 30 is connected via the cellular phone network 60 to the automatic relay system 80. A digital telephone 40 is connected to the ISDN basic communication network 70. Similar to the analog telephones 10 and 20, the digital telephone 40 uses the call originator number notification service. The digital telephone 40 is connected via the ISDN basic communication network 70 to the automatic relay system 80.

The automatic relay system 80 is connected to telephone answering windows 110, 120 and 130. The system automatically relays customer telephone inquiries to the telephone answering windows 110, 120 and 130. The telephone answering windows 110, 120 and 130 respond to inquires from customers.

The automatic relay system 80 has a data base containing information used for relaying customer telephone inquiries to respective windows. In the present embodiment, as data bases of the automatic relay system 80, an access authority data base (DB) 90, a telephone answering window data base (DB) 100 and a historic data base (DB) 140 are provided. The access authority DB 90 has identifiers of types, manufacturers' serial numbers or the like of products purchased by customers, and purchaser information such as telephone numbers (call originator number) used by registered customers with valid telephone answering window E access authorities. The telephone answering window DB 100 has telephone numbers of the respective telephone answering windows, business hours, and information to identify supportable products such as types of products, manufactures' serial numbers or the like. The historic DB 140 has number of accesses to the respective telephone answering windows, access periods, telephone numbers of customers accessed to the windows, and access histories of the customers.

It should be noted that as nodes used by the customers, only four telephones, the analog telephones 10 and 20, the cellular phone 30 and the digital telephone 40 are shown, however, more communication devices such as telephones and terminal devices with a voice communication function are provided.

Figure 2:
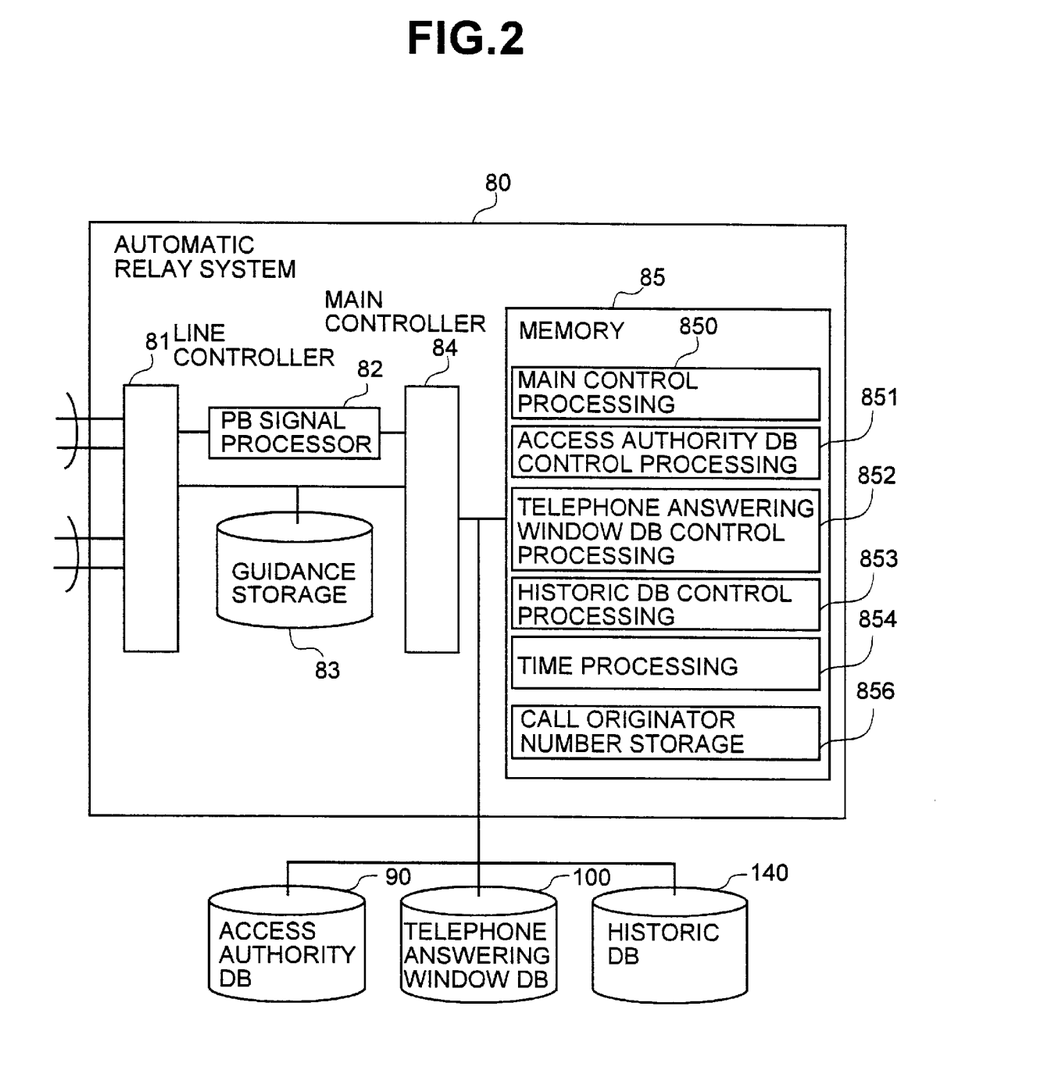
FIG. 2 is a block diagram showing a schematic construction of an automatic relay system.

FIG. 2 is a block diagram showing a schematic construction of the automatic relay system 80. The automatic relay system 80 has a line controller 81, a PB signal processor 82, a guidance storage 83, a main controller 84 and a memory 85. The line controller 81 has a function for communication with the public network 50, the cellular phone network 60 and the ISDN basic communication network 70, and a function for receiving a call originator number notified by the network and a push button signal sent via the network by the customer's operating the push buttons of the telephone. The PB signal processor 82 converts the push button signal, sent by the customer's operating the push buttons of the telephone in accordance with voice guidance, into data (hereinafter referred to as "push information"). In the guidance storage 83, voice response messages are stored in advance for voice response. The memory 85 holds main control processing 850, access authority DB control processing 851, telephone answering window DB control processing 852, historic DB control processing 853 and time processing 854, as programs executed by the main controller 84 to realize various functions of the automatic relay system 80. The main control processing 850 is executed by the main controller 84, to realize a function to refer to the access authority DB 90 and the telephone answering window DB 100, and check existence/absence of registration for the telephone answering windows 110, 120 and 130, based on a call originator number and push information. Further, the main control processing 850 is executed by the main controller 84 to relay an incoming call, of which access authority has been detected, to corresponding one of the telephone answering windows 110, 120 and 130. The access authority DB control processing 851 is executed by the main controller 84 to search the access authority DB 90 to read and write a call originator number, a product identifier and the like. The telephone answering window DB control processing 852 is executed to search the telephone answering window DB 100 to read the business hours, telephone numbers and the like of the respective telephone answering windows. The historic DB control processing 853 is executed to search the historic DB 140 to read and write a customer call originator number, access start time and the like. The time processing 854 is executed to notify time of reception of incoming call from a customer node, access start time and the like. The memory 85 has a call originator number storage 856 which is a storage area for storing a call originator number notified from the network upon reception of incoming call.

The automatic relay system 80 executes the programs stored in the memory 85 by the main controller 84, to perform a function to register a new user's access authority and a function to refuse relay of call from a user without access authority to the telephone answering windows 110, 120 and 130, and supports entry of push information by voice guidance. The access authority DB 90, the telephone answering window DB 100 and the historic DB 140 are connected to the main controller 84. The main controller 84 executes the access authority DB processing 851, the telephone answering window DB control processing 852, the historic DB control processing 853, to access these data bases. In the present embodiment, only one automatic relay system 80 is provided, however, it may be actually arranged such that a plurality of automatic relay systems 80 are provided. Further, the control device of the automatic relay system 80 is incorporated into the automatic relay system 80, however, the functions of the control device may be realized with a computer such as an external PC connected to the system.

Figure 3:
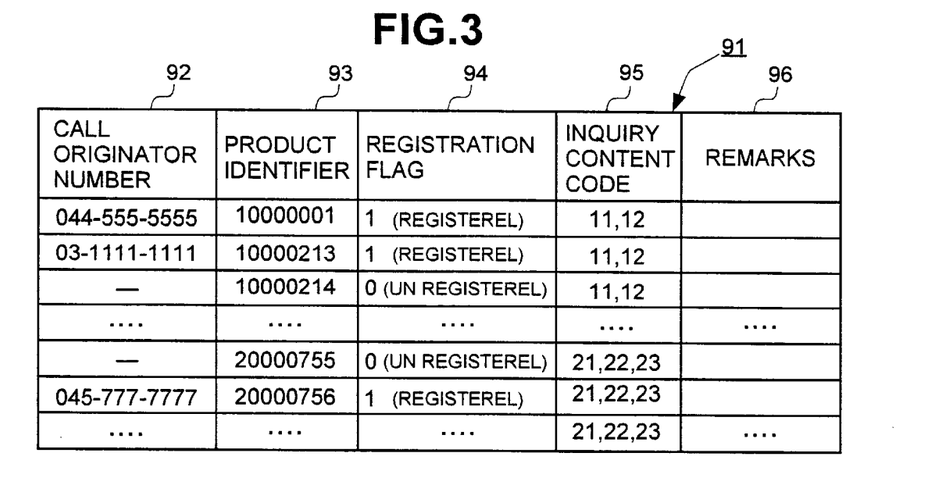
FIG. 3 is a logical table showing an example of an access authority DB.

FIG. 3 is a logical table showing an example of the access authority DB 90. As shown in FIG. 3, authority information 91 stored in the access authority DB 90 includes call originator numbers 92, product identifiers 93, registration flags 94, inquiry content codes 95 and remarks 96. The call originator numbers 92 are telephone numbers of call originators notified from nodes of the customers. The product identifiers 93 are identifiers such as serial numbers to identify products supported by telephone answering window service. The registration flags 94 are flags each indicating whether or not the call originator number 92 corresponding to the product identified by the product identifier 93 is already registered. The inquiry content codes 95 are codes to discriminate the contents of inquiries. The remarks 96 are other information specified with respect to products corresponding to respective product identifiers. In FIG. 3, each product identifier 93 of the access authority DB 90 is set in advance in accordance with a sales plan. When access authority is newly registered, the telephone number of the customer is entered as the call originator number 92 corresponding to the product identifier 93 to be registered. When the registration of access authority has been completed, the registration flag 94 is set to "1" indicative of registered state.

Figure 4:
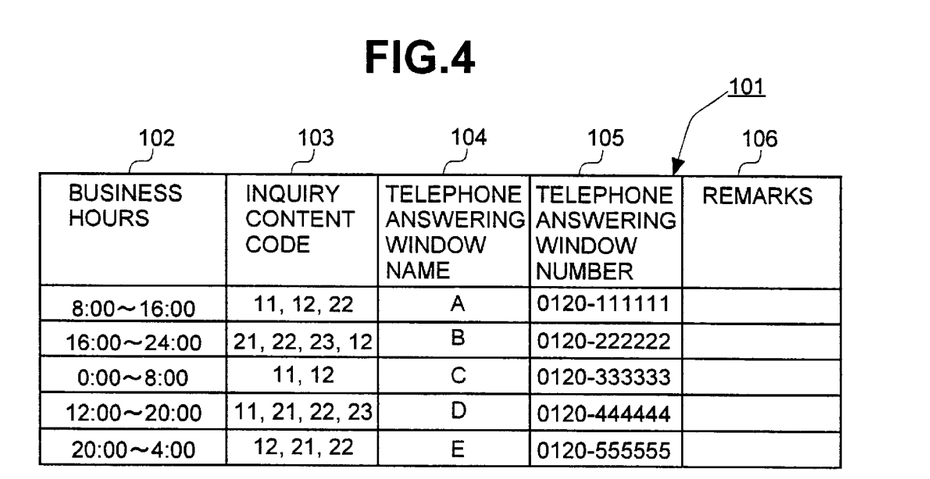
FIG. 4 is a logical table showing an example of a telephone answering window DB.

FIG. 4 is a logical table showing an example of the telephone answering window DB 100. As shown in FIG. 4, telephone answering window information 101 stored in the telephone answering window DB 100 includes business hours 102, inquiry content codes 103, telephone answering window names 104, telephone answering window numbers 105 and remarks 106. The business hours 102 are information indicative of hours to respond to inquiries from customers to the respective telephone answering windows. The inquiry content codes 103 are codes to discriminate the contents of inquiries. The telephone answering window names 104 are names to discriminate the respective telephone answering windows. The telephone answering window numbers 105 are telephone numbers to be used for calling telephone answering windows and connecting the customer nodes to the telephone answering windows as relay destinations. The remarks 106 are other information specified with respect to the respective telephone answering windows. The inquiry content codes 103 are codes of previously-classified contents of inquiries. For example, so-called FAQ (Frequently Asked Questions) are classified into bag-concerned inquiries, browser-concerned inquiries and the like, and numbered. When an inquiry content code 103 is transmitted from a customer node, a telephone answering window best corresponding to the content of inquiry for the customer is selected.

Figure 5:
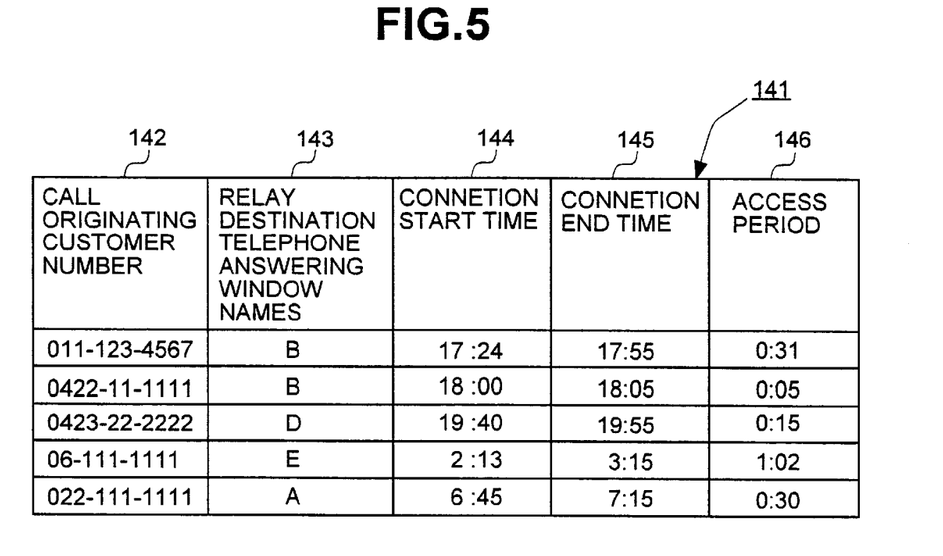
FIG. 5 is a logical table showing an example of a historic DB.

FIG. 5 is a logical table showing an example of the historic DB 140. The historic DB 140 holds historic information 141 related to customers' use of telephone answering windows. The historic information 141 stored in the historic DB 140 includes call-originating customer numbers 142, relay-destination telephone answering window names 143, connection start time 144, connection end time 145 and access periods 146. The call-originating customer numbers 142 are telephone numbers of customers notified upon reception of incoming calls. The relay destination telephone answering window names 143 are names of telephone answering windows to which customer nodes are connected. The connection start time 144 and the connection end time 145 are time of start of connection between customer nodes and the telephone answering windows and time of end of connection. The access periods 146, corresponding to the differences between the connection start time 144 and the connection end time 145, are periods of connection between the customer nodes and telephone answering windows.

FIGS. 6 to 10 are flowcharts showing the flow of automatic relay processing to the telephone answering windows 110, 120 and 130 in the present system. In this case, a customer makes a call from the analog telephone 10 requiring use of the telephone answering windows 110, 120 and 130.

Figure 6:
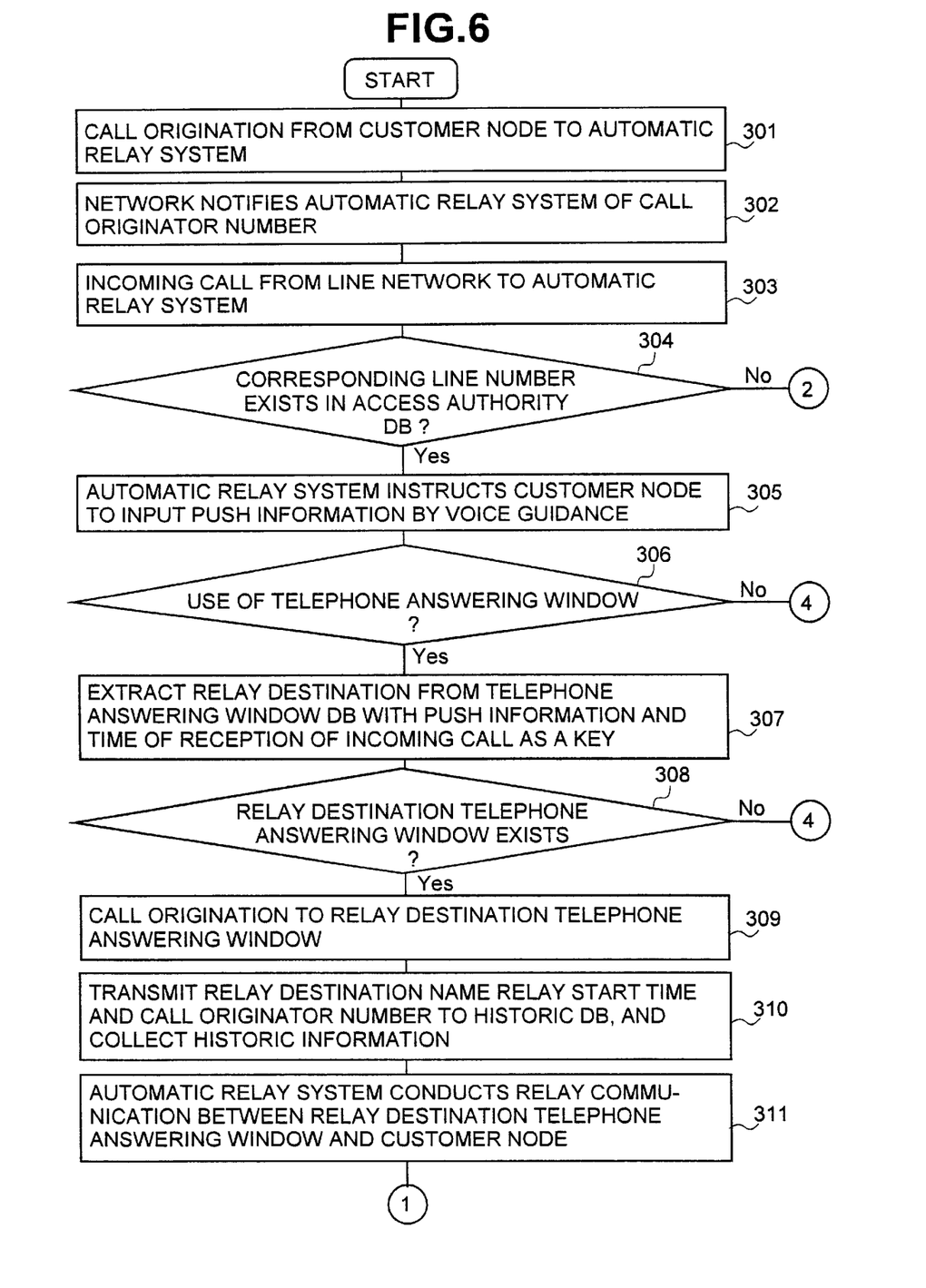
FIGS. 6 to 10 are flowcharts showing a procedure of automatic relay processing.

First, the customer who is to access to the telephone answering window service makes a call from the analog telephone 10 as the customer node, via the public network 50, to the automatic relay system 80 (step 301). By this operation, the public network 50 notifies the telephone number of the analog telephone 10 to the automatic relay system 80. The main controller 84 of the automatic relay system 80 stores a call originator number notified from the public network 50 into the call originator number storage 85 (step 302). The line controller 81 of the automatic relay system 80 allows reception of incoming call from the public network 50 (step 303). The main controller 84 of the automatic relay system 80 starts the access authority DB control processing 851 to search for the notified call originator number notified from the public network 50 so as to determine whether or not the call originator number is already registered in the access authority DB 90. Thus the data base is searched for a record having the call originator number 92 the same as that stored in the call originator number storage 85. As a result, if a record having the same call originator number 92 is found, the main controller 84 acquires the record. In this case, the main controller 84 determines that the customer has access authority to the telephone answering windows. Then the process proceeds to step 305. If there is no record having the same call originator number 92 in the access authority DB 90, it is determined that the number has not been registered, and the process proceeds to step 400 (FIG. 8), at which it is determined whether it is new registration or incoming-call error (step 304).

If the main controller 84 confirms the access authority of the customer at step 304 by using the call originator number notified from the network, the main controller 84 instructs the line controller 81 to output voice guidance. In response to the instruction, the line controller 84 outputs voice guidance to guide the customer to input a product identification code of the product supported by the service of the telephone answering windows 110, 120 and 130 by using the push buttons of the analog telephone 10. A push button signal sent via the public network in response to the voice guidance is converted by the PB signal processor 82 into push information, and forwarded to the main controller 84 (step 305). The main controller 84 determines whether or not the product identification code represented by the push information coincides with the product identifier 93 of the record acquired at step 304. If the product identifiers coincide with each other, the process proceeds to step 307; otherwise, it is determined that there is no available telephone answering window, and the process proceeds to step 601 (FIG. 10) (step 306).

Figure 7:
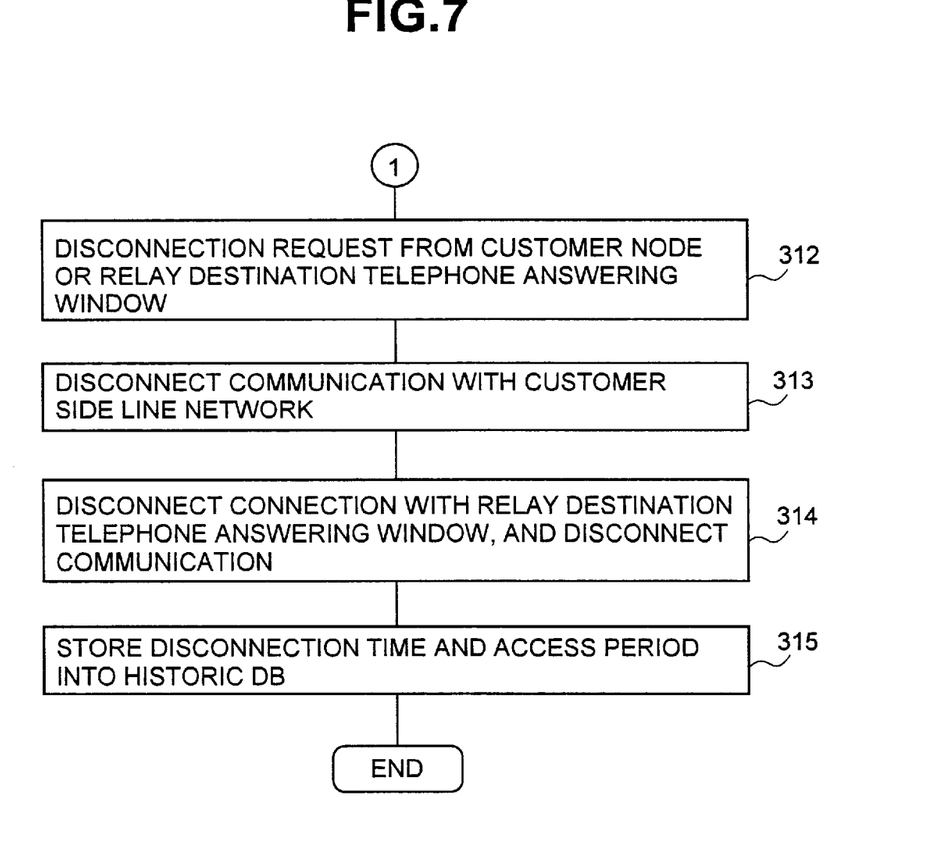

At step 307, the main controller 84 outputs voice guidance via the line controller 81 to guide the customer to input a code indicative of the content of inquiry by using the push buttons. A push button signal sent in response to the voice guidance is converted by the PB signal processor 82 into push information, and forwarded to the main controller 84. The main controller 84 starts the telephone answering window DB control processing 852, to search the telephone answering window DB 100 with time of reception of incoming call to the automatic relay system 80 and the code indicative of the content of inquiry as a search key. Then, the main controller 84 extracts a record including the time of reception of incoming call within the business hours 102 and the inquiry content code sent from the customer's telephone. If there is no record including corresponding business hours 102 and inquiry content code, the main controller 84 determines that there is no available telephone answering window for the customer's inquiry. Then the process proceeds to step 601. If there is a record including corresponding business hours 102 and inquiry content code, the window represented by the telephone answering window name 104 of the record is the available telephone answering window for the customer's inquiry. In this time, the process proceeds to step 309 (step 308).

The main controller 84 acquires the telephone answering window number 105 from the record extracted at step 308, and instructs the line controller 81 to make a call to the number. In response to the instruction, the line controller 81 makes a call to the relay destination telephone answering window (step 309). When the automatic relay system 80 has established communication with the relay destination telephone answering window, the main controller 84 stores the call-originating customer number, the telephone answering window name as the relay destination and the connection start time into the historic DB 140, thus updating the historic information 141 (step 310). Next, the main controller 84 connects the line from the customer's telephone 10 to the relay destination telephone answering window, and starts relay of communication between the customer's telephone 10 and the relay destination telephone answering window. By this operation, the telephone answering window service is provided to the customer (step 311). At this time, the main controller 84 may specify a residential area or a call origination area of the customer from the call originator numbers of the customer nodes stored by respective telephone answering windows, and may notify a system operator, in a realtime manner, of the status of use of area where a number of access requests are made.

Upon the end of telephone answering window service, the analog telephone 10 on the customer side or the relay destination telephone answering window makes a communication disconnection request (step 312). In response to the request, the main controller 84 instructs the line controller 81 to disconnect communication with the customer side line network, thus disconnects communication with the customer side line network (step 313). Next, the main controller 84 instructs the line controller 81 to disconnect communication between the automatic relay system 80 and the relay destination telephone answering window. In accordance with the instruction, the line controller 81 disconnects communication between the system and the relay destination telephone answering window (step 314). Then, the main controller 84 obtains the time of disconnection by the time processing 854, to calculate the access period. The main controller 84 updates the historic information 141 in the historic DB 140 with the obtained disconnection time and the calculated access period as the connection end time 145 and the access period 146. Then, the automatic relay processing ends (step 315).

Figure 8:
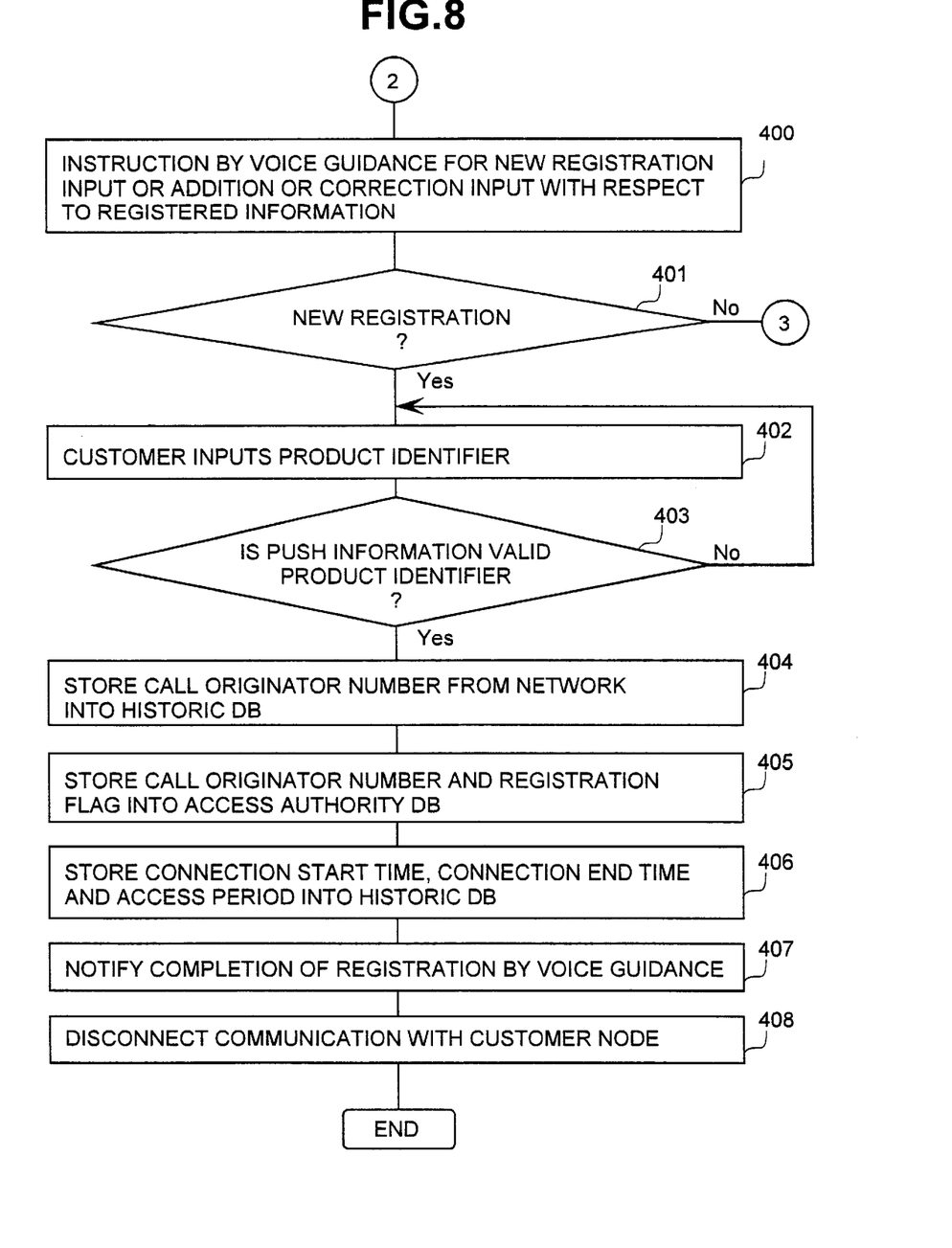
Figure 9:
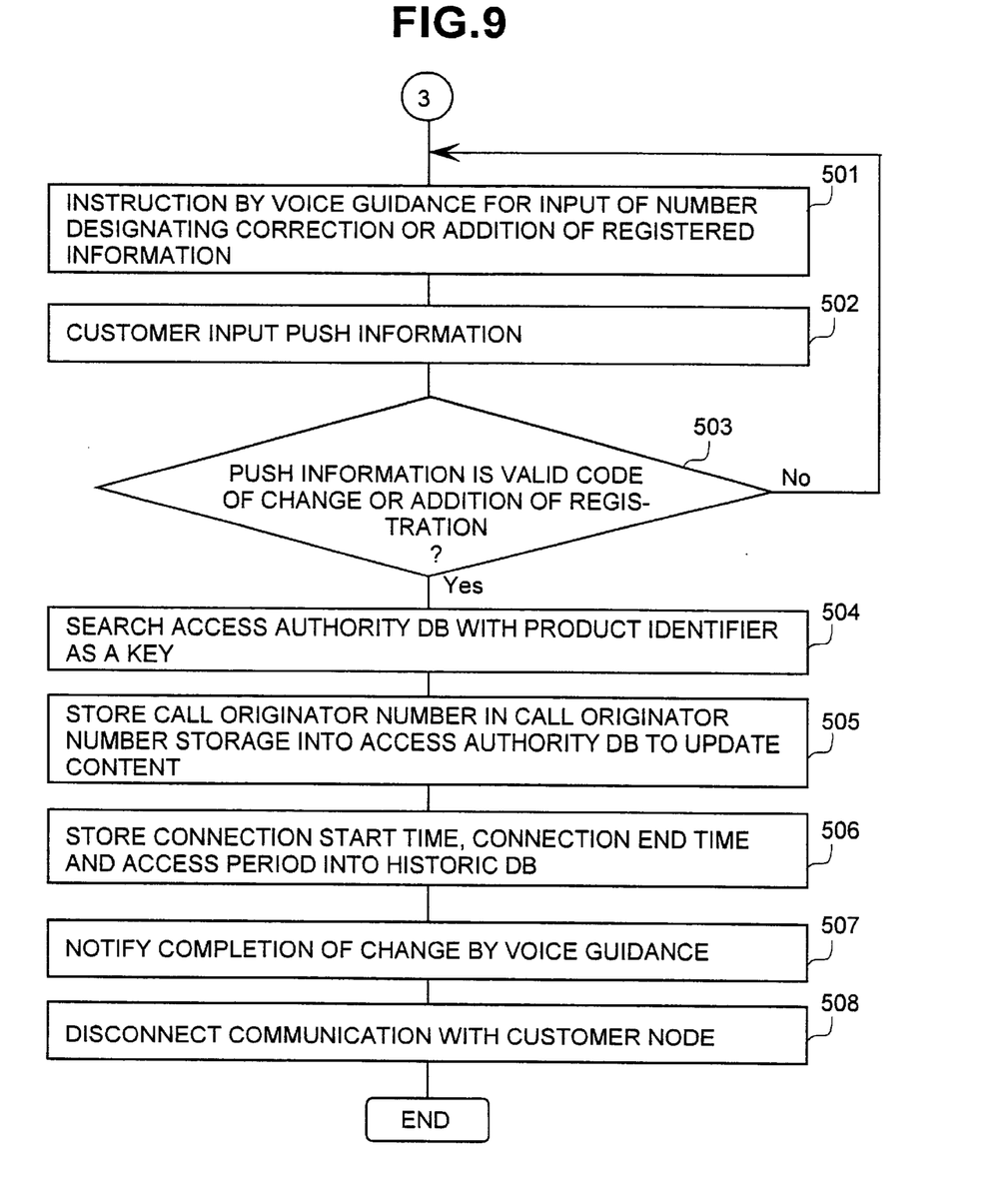

On the other hand, if the result of determination at step 304 is negative, the process proceeds to step 400. At step 400, the main controller 84 outputs voice guidance from the guidance storage 83 to instruct new registration or addition or correction input with respect to registered information. At step 401, a push button signal sent from the customer's analog telephone 10 is converted by the PB signal processor 82 into push information, and the main controller 84 examines whether or not the content of the data indicates new registration. If it is new registration, the process proceeds to step 402, at which the main controller 84 outputs voice guidance to instruct entry of product identification code attached to the product. On the other hand, if the data indicates addition or correction with respect to the registered information, the process returns to step 501 (FIG. 9).

At step 402, the main controller 84 outputs voice guidance to instruct the customer to input the product identification code by using the push buttons of the analog telephone 10. Then a push button signal, sent by the customer's manipulating the push buttons of the analog telephone 10 in accordance with the instruction, is converted by the PB signal processor 82 into push information, then forwarded to the main controller 84. The main controller 84 starts the telephone answering window DB control processing 852 to search the access authority DB 90 for a record including the corresponding product identifier 93 so as to confirm the product identification code represented by the push information as the valid product identification code. If a record including the corresponding product identifier 93 exists, it is determined that the product identification code inputted by the customer is valid and the customer has authority to access the telephone answering windows 110, 120 and 130, then the process proceeds to step 404. If there is no record including the corresponding product identifier 93, the main controller 84 determines that error input or incoming call have been received from a node without access authority. Then the process returns to step 402 (step 403).

At step 404, the main controller 84 reads the call originator number notified from the public network 50 from the call originator number storage 85, and records the call originator number and the current time respectively as the call-originating customer number 142 and the connection start time 144 of the historic DB 140. The main controller 84 stores the call originator number read from the call originator number storage 85 and information indicative of completion of registration as the call originator number 92 and the registration flag 94 of the access authority DB 90 by the access authority DB control processing 851 (step 405). Further, the main controller 84 acquires connection start time and connection end time by the time processing 854, calculates access period, and stores them into the historic DB 140, thus updating the historic information 141 (step 406). Next, the main controller 84 outputs guidance notifying the completion of registration (step 407), and instructs the line controller 81 to disconnect communication with the customer's analog telephone 10. Then the registration processing ends (step 408).

If it is determined at step 401 that new registration is not made, the main controller 84 guides the customer by voice guidance from the guidance storage 83 to input a predetermined number indicative of addition or correction on registered information by using the push buttons (step 501). When the customer manipulates the push buttons in accordance with the voice guidance, a push button signal corresponding to the manipulated push buttons is sent to the automatic relay system 80 (step 502). The push button signal sent from the customer side analog telephone 10 is converted by the PB signal processor 82 into push information and forwarded to the main controller 84. The main controller 84 determines whether or not the push information is valid code to make change or addition with respect to registered information. If the result of determination is affirmative, the process proceeds to step 504, while if it is negative, it is determined that error input has been made, then the process returns to step 501 (step 503).

If the information inputted by the customer at step 503 is to make change or addition with respect to registered information, the main controller 84 outputs voice guidance from the guidance storage 83 to instruct the customer to input a product identification code of the product corresponding to the registered information to which addition or correction is to be made the main controller 84 searches the access authority DB 90 by the access authority DB control processing 851 with the product identification code inputted in response to the voice guidance as a search key, to extract a record with a corresponding product identifier 93 (step 504). Next, the main controller 84 reads call originator number stored in the call originator number storage 85, and makes updating or addition with respect to the call originator number 92 of the extracted record with the call originator number, thus changes the authority information 91 (step 505). The main controller 84 stores the connection start time, connection end time obtained by the time processing 854 and the access period calculated based on the connection start time and the connection end time, into the historic DB 140, thus updating the historic information 141 (step 506). Thereafter, the main controller 84 notifies the customer of the completion of change of registered content by voice guidance from the guidance storage 83 (step 507). Then, the main controller 84 ends the change or addition processing, and instructs the line controller 81 to disconnect the communication with the analog telephone 10 (step 508).

Figure 10:
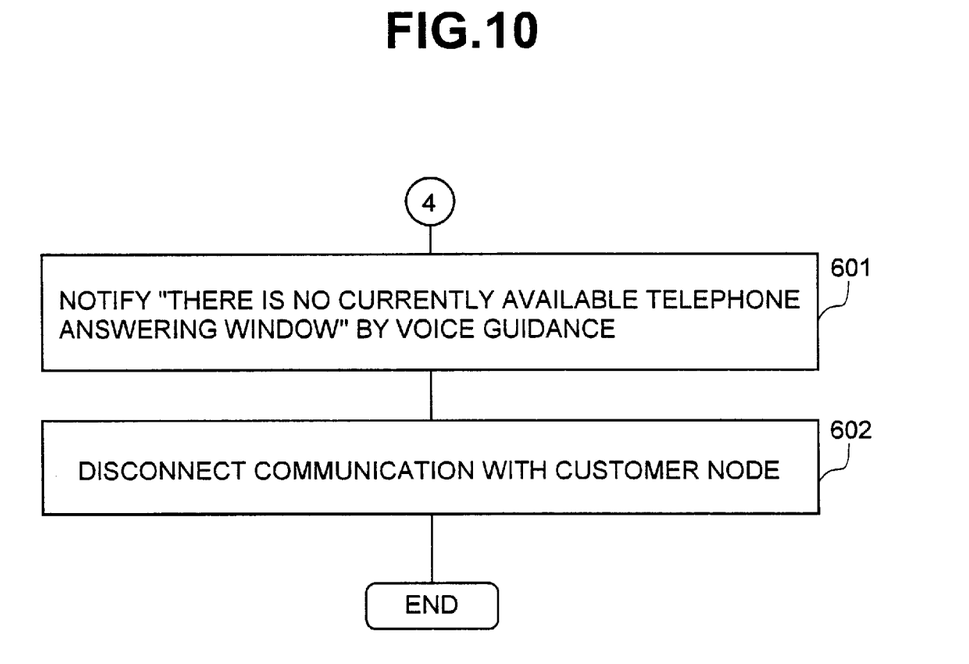

If the results of determination at step 306 or 308 is negative, the process proceeds to step 601. The main controller 84 notifies by voice guidance that there is no available telephone answering window for the customer (step 601). Then, the main controller 84 instructs the line controller 81 to disconnect the communication with the analog telephone 10. In response to the instruction, the line controller 81 disconnects the communication. Then the process ends (step 602).

The flow of processing of the present embodiment in case of the customer s access to service by using the analog telephone 10 connected to the public network 50 is as described above. In use of a telephone on the cellular phone network 60 or the ISDN basic line network 70, the above processing is similarly performed by utilizing a call originator number notified from the network.

As described above, according to the present embodiment, in the automatic relay system, a call-originating customer number notified from the network of the customer as a user, a relay destination telephone answering window name, access period and the like are stored as historic information into a historic DB. Further, the historic information stored in the historic DB can be utilized as useful information for operation of telephone answering windows such as distribution of load on often-used telephone answering window or systematic increase or movement of telephone answering windows. Further, the automatic relay system may specify a residential area or a call origination area of the customer from the call originator numbers of the customer nodes stored by respective telephone answering windows, and may notify a system operator, in a realtime manner, of the status of use of area where a number of access requests are made. Accordingly, the system operator newly install or add telephone answering window(s) in an area where a number of use requests are made, based on the status of use.

As described above, according to the automatic relay system of the present embodiment, upon reception of incoming call from a customer who is to access to telephone answering window service, an available telephone answering window is retrieved and connected to the call. Accordingly, the customer can access to the telephone answering window service without taking notice of available telephone answering windows and business hours of the respective windows. Further, the operator of the telephone answering window service can omit labor of authentication of user of telephone answering window and registration for use of telephone answering window accompanying product sales. Further, the collection of access historic information enables data collection to realize systematic operation of telephone answering windows such as distribution of load on frequently-used telephone answering window(s).

What is claimed is:

1. A relay method in an automatic relay system to be connected via a public network to a node used by a customer, and to relay an incoming call from said node to one of a plurality of telephone answering windows, comprising the steps of:

upon reception of an incoming call from said node, searching a telephone answering window data base holding business hours and telephone numbers of respective telephone answering windows for a telephone answering window available at time of reception of the incoming call;

if a telephone answering window available at the time of reception of the incoming call is found, reading the telephone number of said telephone answering window as a relay destination from said telephone answering window data base, and calling said telephone answering window as the relay destination; and after establishment of communication with said telephone answering window as the relay destination, starting relay of communication between said node and said telephone answering window as the relay destination to provide telephone answering window service to the customer.

2. The method according to claim 1, further comprising the step of checking whether or not said node has a valid access authority, based on a call-originator identifier of said node, notified from the public network, upon reception of the incoming call from said node.

3. The method according to claim 1, wherein said searching step includes the step of receiving an inquiry content code, corresponding to the content of service to which the customer is to access, from said node, and the step of selecting a telephone answering window most suitable to the content of inquiry of the customer from said inquiry content code.

4. The method according to claim 1, further comprising the step of storing historic information indicative of a call originator identifier of said node, a name of the said telephone answering window which presented service, and an access period.

5. The method according to claim 1, further comprising the step of specifying a residential area or a call origination area of the customer from call originator numbers of nodes stored by respective telephone answering windows, and notifying a system operator of status of use of area where a number of access requests are made.

6. A computer system to be connected via a public network to a node used by a customer, and to relay an incoming call from said node to one of a plurality of telephone answering windows, comprising:

a line controller that is connected to a public line and that receives an incoming call from a node connected to said public line;

a window data base holding information on hours in which connection can be made with the respective telephone answering windows; and a main controller that searches said window data base in response to the incoming call from said node, extracts a telephone answering window connectable at time of reception of the incoming call as a relay destination telephone answering window, and controls said line controller to connect a line between said relay destination telephone answering window and said node.

7. A computer system according to claim 6, wherein said main controller issues an instruction to said node to input content information indicative of type of said service, searches said window data base based on the content information to discriminate service, sent in response to said instruction, and extracts a telephone answering window which can provide the service discriminated by said content information, as said relay destination telephone answering window.

8. A computer system according to claim 6, further comprising an access authority data base holding information on customers having authority to access to service provided by said telephone answering windows, wherein upon reception of the incoming call from said node, said main controller searches said access authority data base based on identification information of said node notified from said public line, to determine whether or not the customer of said node has authority to access to said service.

9. A computer system according to claim 6, further comprising a historic data base holding historic information on a period of connection between said node and said relay destination telephone answering window.

10. A computer system according to claim 9, wherein said historic information includes information on an access period of the line between said node and said relay destination telephone answering window.

11. A computer program containing code to enable connection via a public network with a node used by a customer, and to relay an incoming call from said node to one of a plurality of telephone answering windows, said code comprising:

process procedure code for, upon reception of an incoming call from said node, searching a telephone answering window data base holding business hours and telephone numbers of respective telephone answering windows for a telephone answering window available at time of reception of the incoming call;

process procedure code for, if a telephone answering window available at the time of reception of the incoming call is found, reading the telephone number of said telephone answering window as a relay destination from said telephone answering window data base, and calling said telephone answering window as the relay destination; and process procedure code for, after establishment of communication with said telephone answering window as the relay destination, starting relay of communication between said node and said telephone answering window as the relay destination to provide telephone answering window service to the customer.

12. The computer program according to claim 11, wherein said code further includes process procedure code for checking whether or not said node has a valid access authority, based on a call-originator identifier of said node, notified from the public network, upon reception of the incoming call from said node.

13. The computer program according to claim 11, wherein said searching process procedure code further includes process procedure code for receiving an inquiry content code, corresponding to the content of service to which the customer is to access, from said node, and process procedure code for selecting a telephone answering window most suitable to the content of inquiry of the customer from said inquiry content code.

14. The computer program according to claim 11, wherein said code further includes process procedure code for storing historic information indicative of a call originator identifier of said node, a name of the said telephone answering window which presented service, and an access period.

15. The computer program according to claim 11, wherein said code further includes process procedure code for specifying a residential area or a call origination area of the customer from call originator numbers of nodes stored by respective telephone answering windows, and notifying a system operator of status of use of area where a number of access requests are made.

* * * * *